United States Patent
Juret et al.

(10) Patent No.: US 6,177,649 B1
(45) Date of Patent: Jan. 23, 2001

(54) METHOD AND APPARATUS FOR REGULATING THE POSITION OF A CAMERA IN A THERMAL CONTROL SYSTEM FOR WELDING

(75) Inventors: Thierry Juret, Courcelles Chaussy; Jean Philippe, Veckring, both of (FR)

(73) Assignee: Sollac, Puteaux (FR)

( * ) Notice: Under 35 U.S.C. 154(b), the term of this patent shall be extended for 0 days.

(21) Appl. No.: 09/235,497

(22) Filed: Jan. 22, 1999

(30) Foreign Application Priority Data

Feb. 5, 1998 (FR) .................................................. 98 01311

(51) Int. Cl.⁷ .............................. B23K 26/03; B23K 26/26
(52) U.S. Cl. ................................ 219/121.63; 219/121.83; 219/124.34
(58) Field of Search ........................ 219/121.63, 121.64, 219/121.83, 124.34, 121.13, 121.14

(56) References Cited

U.S. PATENT DOCUMENTS

| | | | |
|---|---|---|---|
| 4,410,787 | * 10/1983 | Kremers et al. | 219/124.34 |
| 5,001,324 | * 3/1991 | Aiello et al. | 219/121.83 |
| 5,045,663 | 9/1991 | Neiheisel et al. | 219/121.63 |
| 5,601,737 | 2/1997 | Asahi et al. | 219/121.83 |
| 5,674,415 | * 10/1997 | Leong et al. | 219/121.83 |
| 6,084,203 | * 7/2000 | Bonigen | 219/121.63 |
| 6,084,223 | * 7/2000 | Dietz et al. | 219/121.83 |

FOREIGN PATENT DOCUMENTS

| | | |
|---|---|---|
| 296 06 826 U | 7/1996 | (DE) . |
| 1-210188 | * 8/1989 | (JP) . |
| 10-24371 | * 1/1998 | (JP) . |

OTHER PUBLICATIONS

French Search Report.

* cited by examiner

*Primary Examiner*—Geoffrey S. Evans
(74) *Attorney, Agent, or Firm*—Nixon Peabody LLP; Thomas W. Cole

(57) ABSTRACT

Both a method and apparatus for regulating the position of a camera in a thermographic control and monitoring arrangement is provided for a system for welding together at least two metal plates along a joint plane. The apparatus includes a welding head that generates a high energy-density welding beam, a camera for thermographically monitoring the welding carried out by the welding beam, a movable frame member for supporting the welding head and camera, a fixed light source disposed in a zone that is accessible by the welding beam generated by the welding head, and an adjustment assembly for regulating the position of the camera with respect to the welding head. In the method, the welding beam is moved into a reference position with respect to a point source of light. Next, the frame member is displaced by a specific distance d corresponding to the distance desired between an impact point I of the welding beam and the field of view of the camera on the plate is being welded. Next, the field of view of the camera is adjusted so that the camera registers signals from the light source. Finally, the camera is locked into position with respect to the frame member. By accurately adjusting the position of the camera with respect to the weld created by the welding head, the resulting thermal plot generated by the camera can be accurately interpreted.

10 Claims, 4 Drawing Sheets

METHOD AND APPARATUS FOR REGULATING THE POSITION OF A CAMERA IN A THERMAL CONTROL SYSTEM FOR WELDING

BACKGROUND OF THE INVENTION

The invention generally relates to welding, brazing, metal fusion and the like (hereinafter "welding"), and in particular to a control system for welding that operates by means of infrared thermography.

In the welding of two metal plates disposed end-to-end with the use of a welding head which generates a high energy-density welding beam, e.g. a laser beam or electron beam, there are essentially three phases of the operation:

temperature rise in the material;
 fusion of a certain amount of the metal; and
 cooling of the welded joint and environs.

The time, spatial location, and temperature are the three variables which define the thermal aspects of the process; i.e., for fixed conditions of welding, at a given instant a point disposed in the zone being welded has a given "thermal level" giving rise to IR emissions, and representing enthalpy or the like.

Accordingly, analysis of the thermal image of the weld during the welding process enables one to monitor the quality of the welded joint and to control the quality of the welding process, in real time, amid changing variables.

It is known to achieve such monitoring and control using an infrared-sensitive camera (IR camera) which indicates the thermal profile prior to, during, and/or after the fusion.

Depending on the type of information sought, the IR camera may observe the zone immediately ahead of the advancing zone of fusion; this enables one to have, e.g., a thermal image which can be used for guiding the welding head. The trough in the thermal profile transverse to the plane of the joint represents the gap separating the two metal plates to be welded together. The IR camera may also observe the thermal image at the fused mass of metal in order to indicate the temperature at the surface of the metal, and the width of the molten mass. Or the IR camera may observe the zone behind the fusion zone so as to determine the depth of penetration and variations in the welding process.

Three forms of visual display may be provided for the thermal images of the zone observed by the IR camera along the length of the weld:

a longitudinal thermal plot;
 a transverse profile; and
 a three-dimensional thermal surface.

The IR cameras used in this type of application may be of a scanning type wherein the elementary field is moved by optomechanical means or electronic means. Optomechanical means include complete rotation of a system, oscillation of a plane mirror, spinning rotation of a drum bearing a polygonal mirror (i.e. a mirror in the shape of a polygonal parallelepiped), rotation (e.g. spinning rotation) of a refractive polygonal prism, rotation of a drum bearing lenses, use of a diaporameter, and use of a linear bank of detectors. The latter arrangement using a linear bank of detectors has the advantage of not requiring mechanical movements. One may also employ a "matrix camera".

The aforesaid known method of monitoring welds and controlling the welding process with the use of IR thermography is described in the following publication articles:

*La Thermographie Infrarouge,* pub. Technique et Documentation Lavoisier, 3rd Ed. 1989;

*Capteurs Infrarouges: Le Soudures Analysées En Temps Reel—Infrared Detectors—Real-Time Analysis Of Welding,* in the journal *Mesures,* Jan. 19, 1987.

In order to be able to make practical use of the images produced by the IR camera for monitoring welds and controlling the welding process in view of the high temperature gradients present in welding (which are typically several hundred degrees Centigrade per millimeter), one must have full and accurate control over the position of the field of view of the camera with respect to the point of impact of the welding beam, in terms of:

longitudinal position along the axis of the weld (along the plane of the joint);
 position transverse to said axis; and
 focusing of the optics of the camera.

If one does not perfectly control the positioning of the field of view of the camera with respect to the point of impact of the welding beam, it will be difficult to interpret the thermal plots obtained because they will not represent the field supposed but rather a neighboring zone.

Thus, e.g., if the field of view of the camera is theoretically 5 mm behind the point of impact of the welding beam along the axis of welding but the actual field of view is only 3 mm behind said point of impact, the interpretation of the thermal image in terms of the maximum temperature may result in one unwarrantedly reducing the power of the beam, thereby leading to the delivery of welded plates in which the weld is of poor quality. If the actual field of view of the camera is shifted transversely to the welding axis compared to the supposed field of view, the thermal profile will be shifted and will be interpreted as a shifting of the welding axis with respect to the plane of the joint of the plates being welded. Corrective shifting of said welding axis will not restore the welding axis as supposed but rather will shift the actual welding axis to a laterally incorrect locus even though the thermal profiles signaled by the camera will now be interpreted as perfectly centered.

Thus, it is important to have full and accurate control of the position of the field of view of the camera with respect to the point of impact of the welding beam. This can be achieved by achieving accurately reproducible regulation of the position of the thermographic IR camera relative to the welding head; i.e. such that said relationship is preserved with each regulative action.

One may consider regulating both the position of the welding head and the position of the camera with respect to a reference point fixed in space, e.g. a point on the housing of the welding machine. In practice, such a reference point and frame of reference are indeed reliable in providing a means of regulating the relative position of the welding head and the camera; however, they cannot guarantee constancy of the exact position of the zone of the metal plates observed by the camera relative to the point of impact of the welding beam on said plates, because of variabilities due to tolerances in the dimensions of various components which are components of the camera and of the welding head, and because of possible time wise variations in the optical paths of these apparatuses.

SUMMARY OF THE INVENTION

The object of the invention is a method of regulating the geometric position of a camera in a thermal or thermographic control and/or monitoring arrangement associated with a system for welding together of at least two metal plates, which method guarantees accurate positioning of the zone of the plates observed by the camera, particularly with respect to the point of impact of the welding beam on said plates, wherewith the above-mentioned problems of tolerances and of variations of optical paths are avoided.

The inventive method which accomplishes the stated object of the invention is a method of regulating the position of a camera in a thermal or thermographic control and/or monitoring arrangement associated with a system for welding together of at least two metal plates along a joint plane describing the joint of the plates being welded, wherein the position of said camera is regulated with respect to a welding head, and wherewith the welding apparatus comprises:

a welding head which generates a high energy-density welding beam, e.g. a laser beam or electron beam, and a camera for thermographically monitoring the welding being carried out by means of said beam, which welding head and camera are both supported by a frame member; wherewith, in the subject method, in a first step, the welding beam is moved into a reference position with respect to a point source of light disposed in a zone of the welding apparatus or installation, which zone is accessible by the welding beam, which reference position is in a plane P close to or coincident with the "median" plane between the two planes containing the respective principal faces of the metal plates which faces are directed generally toward the welding head and the camera;

in a second step, the frame member is displaced in the direction of the plane of the joint by a specific distance d which corresponds to the distance desired in said direction between:

the impact point of the welding beam on the metal plates being welded and the field of view of the camera on said plates;

in a third step, the field of view of the camera is adjusted such that the camera registers signals from the aforesaid light source;

in a fourth and final step, the camera is locked in position with respect to the frame member.

According to other features of the invention:

In the first step, the welding beam is moved into a reference position by means of a low power laser light beam visible to the eye, which low power beam is coaxial with the welding beam and serves as an aiming or aligning beam.

If the high energy-density welding beam is a laser beam, during the first step one positions said welding beam in a reference position by means of said welding beam itself, namely by coupling said beam with a device which renders said beam visible.

A light source apparatus is chosen which has a diaphragm and which gives rise to light with "isotropic" properties at least in the directions directed toward the camera.

In the first step, the manner in which the welding beam is positioned in a reference position with respect to the light source is to direct the visible-light aiming or aligning laser beam, or the welding beam, toward the diaphragm of the light source apparatus.

In the first step, the manner in which the welding beam is positioned in a reference position with respect to the light source is to direct the visible-light aiming or aligning laser beam, or the welding beam, toward a point O the spatial coordinates of which are controlled with respect to the spatial coordinates of the diaphragm of the light source apparatus.

The field of view of the camera is adjusted by displacing said camera and/or by electronic adjustment of said field of view ("windowing").

In an intermediate step prior to locking the camera in place, the focal length of the camera regarding the light source is adjusted.

The above-stated object of the invention may be accomplished with the aid of an inventive apparatus for carrying out the inventive method, in a system for welding together at least two metal plates, which apparatus comprises a welding head which generates a high energy-density welding beam, and a camera for thermographically monitoring the welding being carried out by means of said welding beam, which welding head and camera are both supported by a frame member;

characterized in that said apparatus is comprised of:

means of displacement of the frame member;

a fixed light source disposed in a zone of the welding apparatus or installation, which zone is accessible by the welding beam; and means for geometrically regulating the position of the camera with respect to the welding head.

According to another feature of the invention, in the inventive apparatus:

the light source is comprised of:

a cavity of a cylindrical or spherical shape, and a diaphragm formed by an opaque plate having an aperture with diameter less than 1 mm, wherewith the thickness of the opaque plate at said aperture is less than 0.3 mm; and the means of geometrically regulating the position of the camera with respect to the welding head include at least one micrometer stage or the like.

BRIEF DESCRIPTION OF THE DRAWINGS

The characteristics and advantages of the invention will be appreciated from the following description with reference to the accompanying drawings, which description and which drawings are offered solely by way of example.

DETAILED DESCRIPTION OF THE PREFERRED EMBODIMENT

Figure 1:
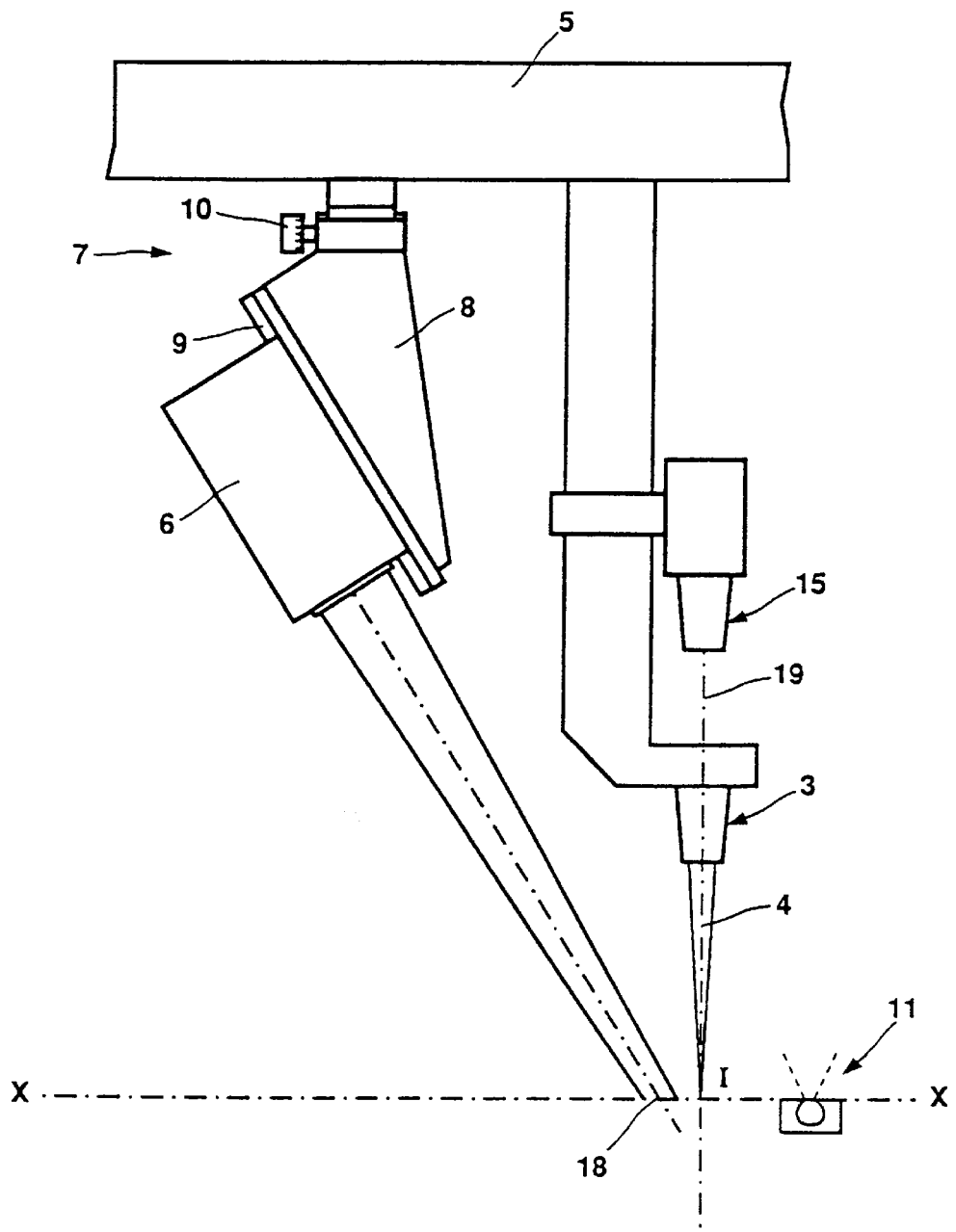
FIG. 1 is a partial lateral view of a welding apparatus comprising a welding head and a thermographic monitoring and control camera equipped with an inventive device for carrying out the inventive method.

One recognizes in FIGS. 1 and 2A–2D a welding apparatus employing a high energy-density beam for welding of at least two metal plates 1, 2 (not shown in FIG. 1) disposed end-to-end or slightly overlapped, comprised of steel, aluminum, or an aluminum alloy, bare or coated, with identical or different thicknesses, wherewith the plane of the joint is represented by the axis X—X.

This type of general arrangement is well known in the art; accordingly, in the following description only the elements needed to understand the invention will be described.

The apparatus comprises means 3 of generating a high energy-density beam 4 suitable for welding the metal plates, which beam may be a laser beam or an electron beam.

The beam-generator 3 (also called the "welding head" 3) is fixed to a frame member 5, generally a structural beam, which member 5 is displaceable at least in the direction of the plane of the joint of the metal plates being welded. Said displacement in the welding apparatus is effected by known means employed in commercially available welding apparatuses, which means are therefore not shown in the drawings and will not be described further.

An IR camera 6 is also fixed to the frame member 5. Depending on the type of information being collected, the camera may serve to observe:

a zone disposed immediately ahead of the advancing fusion zone, or a zone providing a thermal image at the fused metal, or a zone behind the advancing fusion zone.

Assume that in the drawings the frame member 5 is being moved from left to right during the welding of the plates, and the camera 6 shown is disposed such as to observe a zone behind the fusion zone.

Camera 6 is fixed to frame member 5 by means 7 which can regulate its geometric position on said member 5 with respect to the welding head 3.

In the exemplary embodiment shown, these means 7 comprise a support 8 on which the camera 6 is mounted via a controllable gliding mechanism 9 guided in linear displacement movement and a micrometer table 10, which table 10, disposed between support 8 and the frame member 5, enables precise and reproducible displacement (i.e. movement from one position to another) of the camera on said frame member.

A point source of light 11 is fixed in the welding apparatus in a zone of the apparatus which is accessible by the welding beam 4. Said light source 11 is disposed in a plane P which is close to or coincident with the "median" plane between the two planes containing the respective principal faces of the metal plates being welded, which faces are directed generally toward the welding head 3 and IR camera 6 (viz. the upper faces in the embodiment shown), which faces are namely face 1A of metal plate 1 and face 2A of metal plate 2; thus, the plane P is parallel to or coincides with said median plane, wherewith it is advantageous if plane P is displaced in a direction orthogonal to said median plane in the positive or negative sense, at a distance of less than 5 mm.

Note that if the two metal plates 1, 2 are of identical thicknesses, generally they will be supported on the support table of the welding apparatus such that their faces which are directed generally toward the welding head 3 and IR camera 6 (viz. faces 1A and 2A) will be coplanarly aligned. If the metal plates 1, 2 are not of identical thicknesses, said plates may nonetheless be supported on said support table such that said faces 1A, 2A will be coplanarly aligned. Accordingly, the light source 11 will be disposed in a plane P which is close to or coincident with the plane containing said principal faces 1A, 2A.

Advantageously, the plane P coincides with the "median" plane between the two planes containing the respective principal faces 1A, 2A which are directed generally toward the welding head 3 and IR camera 6.

The light source 11 is a source of light with "isotropic" properties at least in the directions directed toward the camera 6 for the various camera positions possible in the range of controlled movement of said camera; i.e., at least in these directions the radiation emitted by the light source 11 is of uniform intensity. To enable such a light source to be easily realized, and to ensure that such a light source is adaptable to the three possible cases of the disposition of the field of view of the IR camera 6 (viz., ahead of, at, or behind the fusion), preferably said light source generates light isotopically through a cone of at least 120°.

The light intensity of the source 11 should be compatible with the spectral band of the IR camera 6 so that the camera can adequately register the light.

Figure 3:
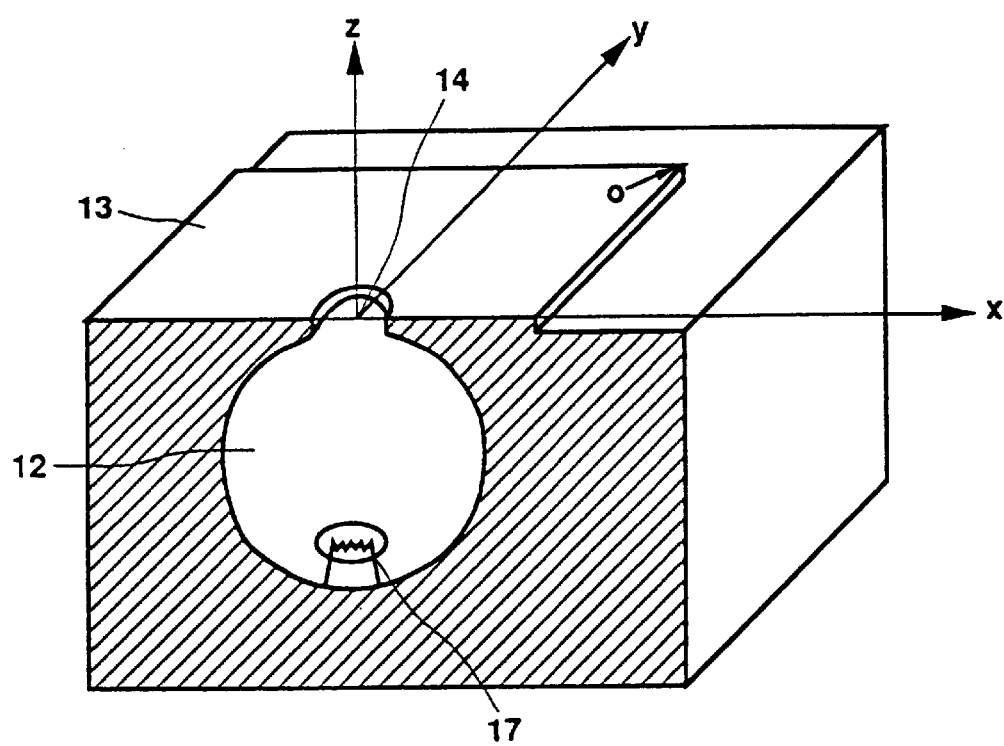
FIG. 3 is a cross section of an exemplary embodiment of a light source apparatus according to the invention.

E.g., as indicated in the drawings FIG. 3, the light source 11 may comprise a point source associated with a reflective cavity 12 of a cylindrical or spherical shape, wherewith a light generator 17 which may be a light bulb, e.g. an incandescent bulb is disposed in the interior of said cavity, and wherewith a diaphragm is provided comprised of an opaque plate 13 having an aperture 14 with diameter less than 1 mm. To ensure isotropic light, the thickness of the opaque plate 13 at the aperture is less than 0.5 mm, and preferably less than 0.3 mm. The thinner the opaque plate 13 at the aperture 14 the greater the angular extent of the cone of isotropic light emission. If the thickness of said plate 13 at the aperture 14 is less than 0.3 mm, the light emitted will be isotropic over a cone of almost 180°.

Advantageously, the thickness of the opaque plate 13 at the level of the aperture 14 is chosen to be less than or equal to the diameter of said aperture.

As will be appreciated from the description of the inventive method infra, it is essential, in order to be able to carry out said method, that the welding apparatus comprises:

means for displacing the frame member 5 (which means are not shown);

a light source 11 disposed in a zone of the welding apparatus or installation, which zone is accessible by the welding beam; and means 7 for regulating the position of the camera 6 with respect to the welding head 3.

Figure 2A:
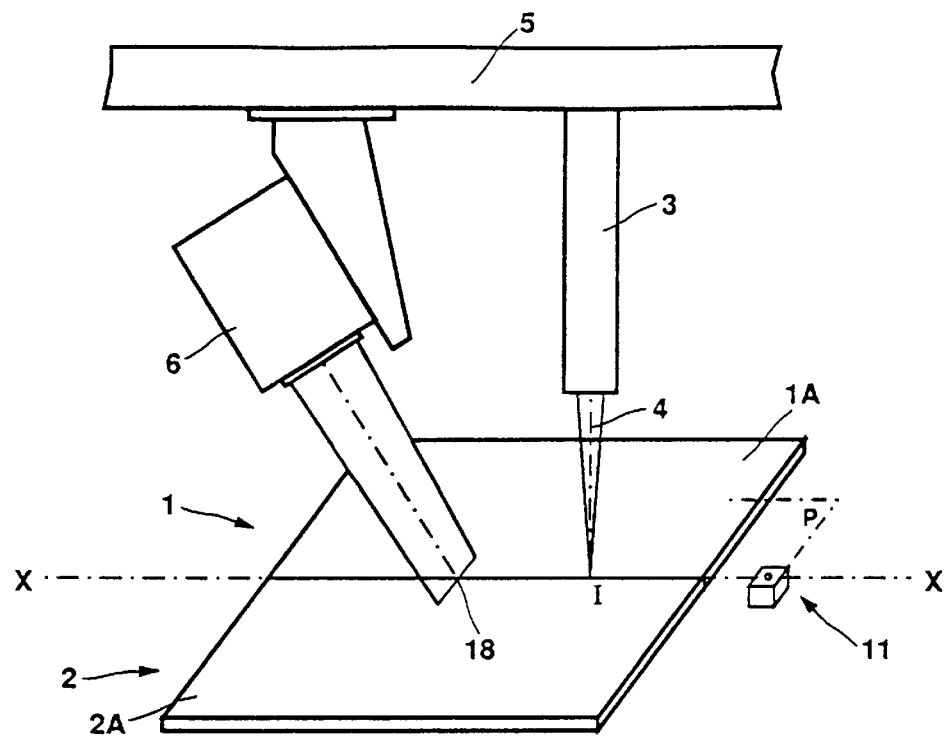
FIGS. 2A to 2D are schematic views illustrating the various steps of the inventive method.
Figure 2B:
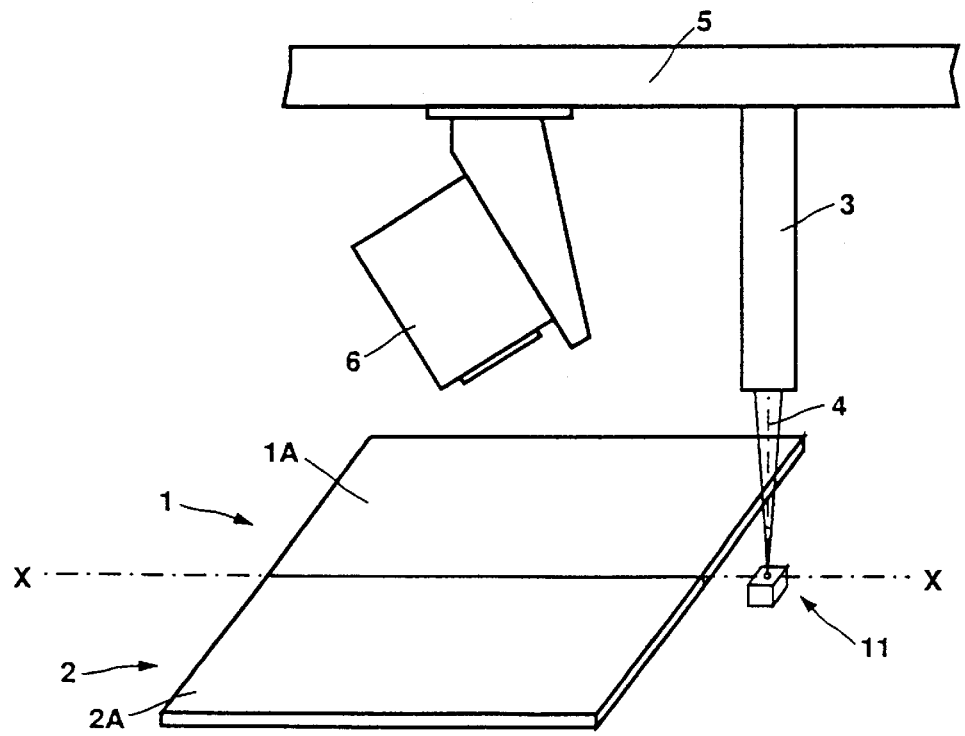
Figure 2C:
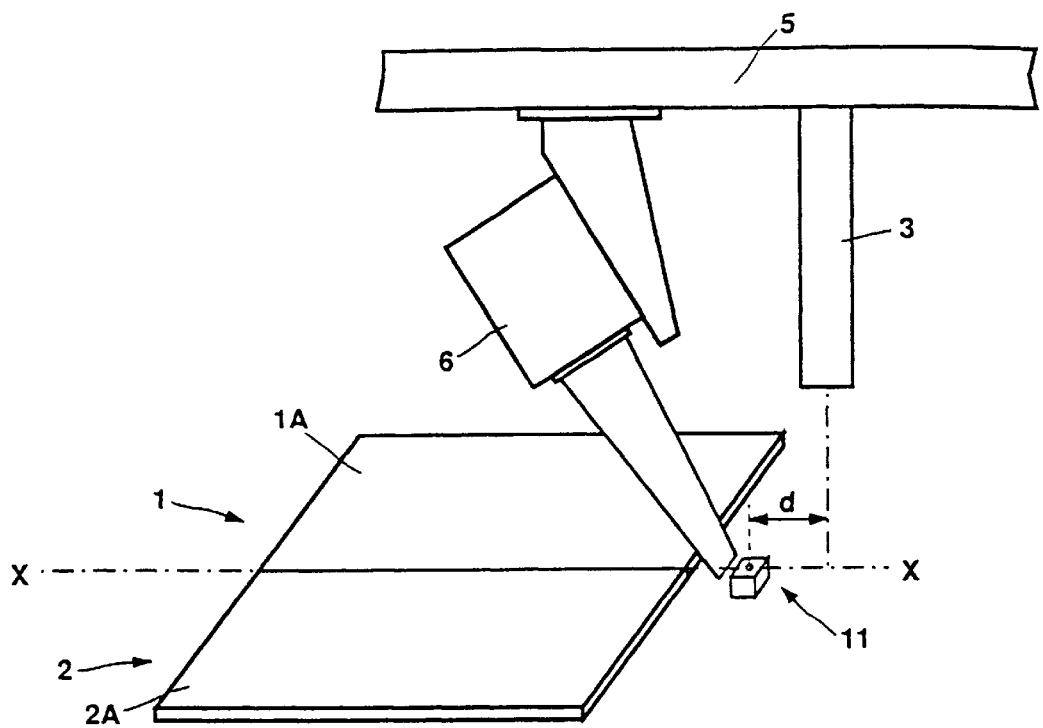
Figure 2D:
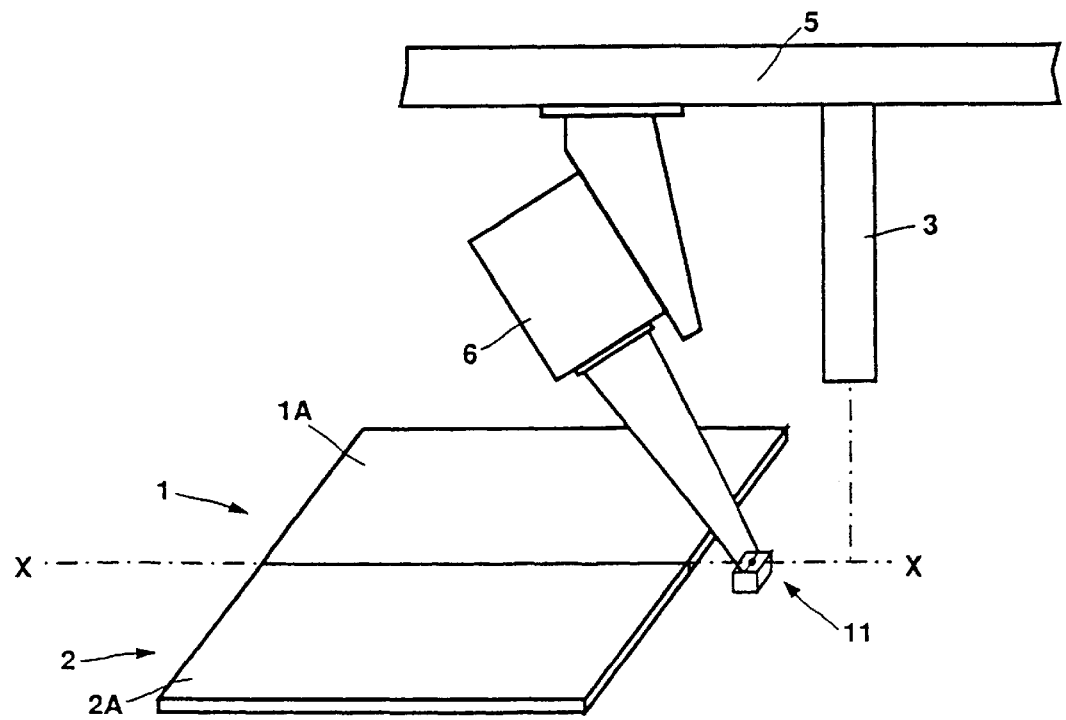

The method of regulating the position of the camera 6 with respect to the welding head 3 has four steps:

A first step, the result of which is shown in FIG. 2B. In this first step, the welding beam 4 is moved into a reference position with respect to the point source of light 11 disposed in a zone of the welding apparatus or installation which zone is accessible by the welding beam, which reference position is in a plane P close to or coincident with the "median" plane between the two planes containing the respective principal faces 1A, 2A of the metal plates which faces are directed generally toward the welding head 3 and IR camera 6;

A second step, the result of which is shown in FIG. 2C. In this second step, the frame member 5 is displaced in the direction of the plane of the joint by a specific distance d which corresponds to the distance desired in said direction between:

the impact point I of the welding beam on the metal plates being welded and the field of view 18 of the camera 6 on said plates;

A third step, the result of which is shown in FIG. 2D. In this third step, the field of view of the camera 6 is adjusted such that the camera registers signals from the light source 11;

A fourth and final step, wherein the camera is locked in position with respect to the frame member 5.

The first step of the method, wherein the welding beam 4 is moved into a reference position with respect to the point source of light 11, may be accomplished in two different ways.

According to a preferred embodiment of the method which is the simpler embodiment, the welding beam 4 is positioned directly over the aperture 14 of the light source 11. For this purpose, the frame member 5 is displaced until the point of impact I of the welding beam 4 coincides with the center of said aperture 14. During this operation, it is not necessary for the light source 17 to be functioning.

Obviously, the welding beam must be operating at low power, e.g. in the range of 2–100 milliwatts, so that it does not damage the light source apparatus 11. If the welding head 3 can generate a beam of a power which can be regulated from a few milliwatts to the power needed to weld the two metal plates 1, 2, which necessary power depends on the nature of the materials of which said plates are comprised, the welding beam can be used directly for this. In this case, it is preferable to couple the welding beam with a device which visibilizes it, e.g. an IR camera, to facilitate the adjustment.

One may also use a low-power laser light beam 19 visible to the eye for this first step. Such beam 19 is coaxial with the welding beam. It may be, e.g., a red beam generated by a He—Ne laser or laser diode.

In the exemplary embodiment illustrated in FIG. 1, the visible light beam 19 which beam is coaxial with the welding beam 4 is generated by a head 15. Head 15 may be pivotably mounted on the welding head 3, and welding head 3 may be retractably mounted so that it can be moved out of the way when the head 15 for generating the visible light for aiming or aligning purposes is in operation. Alternatively, means may be provided whereby the welding head 3 can be replaced by the said visible light generator head 15 when carrying out this step of positioning the welding beam 4 in a for reference purposes with respect to the light source apparatus 11.

One may also employ a device of the type of a semi-transparent plate whereby one laser head can be adapted to generate two beams having different characteristics.

According to a second embodiment of the method, one may position the welding beam 4 for reference purposes with respect to the light source apparatus 11 by irradiating a point O with the visible laser light beam 19 or the welding beam 4, where point O is a point having spatial coordinates well determined with respect to the coordinates of the diaphragm of the light source apparatus 11. In this case, it suffices if, after one irradiates this point O with the visible light beam 19 or welding beam 4, one displaces the frame member 5 so as to position the welding beam 4 for reference purposes with respect to the light source apparatus 11 (namely in the reference position at said apparatus 11).

For example, as shown in FIG. 3, a point O corresponds to the corner of a step descending from the opaque plate 13 on the light source apparatus 11. The spatial coordinates of the point O are known with great precision, in the coordinate system (x, y, z) centered at the center of the aperture 14 of the light source apparatus 11; thus it is easy to displace the frame member 5 according to the inverse of said coordinates, to position the light beam 19 and/or welding beam 4 (or the field of view 18 of the camera 6) at said aperture.

This second embodiment of the method requires perfect control over the displacements of the frame member 5.

The precision and accuracy of the measurements made by the camera 6 during the welding operations depends directly on the accuracy with which the welding beam 4 has been positioned for reference purposes with respect to the light source.

No particular problems are posed in displacing the frame member 5 in the direction of the plane of the joint by a specific distance d corresponding to the desired distance along said direction between the point of impact I of the welding beam on the metal plates being welded and the field of view 18 of the camera on said plates (second step of the method).

Then one adjusts the field of view of the camera 6 to narrowly include the light source 11.

This adjustment of the field of view of the camera 6 may be accomplished in two ways—by displacement of the camera itself or by electronic adjustment of the field of view "windowing," or both. If the camera 6 is of the "linear" type, its field of view must be adjusted by displacement of the camera in the direction of the plane of the joint via means 7 of regulating the position of the camera on the frame member 5. Displacement of the camera itself in the direction transverse to the plane of the joint may be impracticable, but the field of view of the camera may be displaced in said direction by electronic "windowing", e.g. by selecting particular IR receptors associated with the camera which receptors will be activated. If the camera 6 is a so-called "2-D" camera, or a matrix camera, then the field of view of the camera can be adjusted in both directions by electronic "windowing". Also, the camera may be provided with optical deflector means for adjusting its field of view.

In order to accomplish this operation of adjusting the field of view of the camera to narrowly include the light source, it is preferable to choose a light source apparatus 11 having a diaphragm which apparatus 11 generates light isotopically, at least in the directions directed generally toward the camera. This characteristic enables one to ensure that the camera will optimally detect the light emitted by the light source 11.

An important feature of the invention is the position of the light source apparatus 11 in the welding apparatus or welding installation. The light source apparatus 11 must be disposed in a zone of the welding apparatus or installation which zone is accessible by the camera 6 and the welding beam 4; such a zone may be, e.g., at one side of the support table for the metal plates, at the periphery of said table. In order to avoid spurious registration of a reference point, it is preferable to dispose the light source apparatus 11 in a plane P which is close to or coincident with the "median" plane between the two planes containing the respective principal faces 1A, 2A of the metal plates 1, 2 which faces are directed generally toward the welding head 3 and the camera 6.

There are multiple choices for the plane P.

According to a first embodiment, the plane P may be chosen to coincide with the "median" plane between the two planes containing the respective principal faces 1A, 2A of the metal plates 1, 2 which faces are directed generally toward the welding head 3 and the camera 6. This choice enables one to have a field of view of the camera on said metal plates during the welding, which field of view is perfectly sharp and well-defined.

According to a second embodiment, the plane P may be chosen close to the "median" plane between the two planes containing the respective principal faces 1A, 2A of the metal plates 1, 2 which faces are directed generally toward the welding head 3 and the camera 6, wherewith the plane P is a plane parallel to said median plane displaced therefrom in a direction orthogonal to said median plane in the positive or negative sense at a distance of less than 5 mm. In this case the field of view of the camera on the metal plates is slightly out of focus, which enables the application of a low-pass filter to the image received or registered by said camera.

Concerning the definition of the "median" plane between the two planes containing the respective principal faces 1A, 2A of the metal plates 1, 2, which faces are directed generally toward the welding head 3 and IR camera 6, two choices are also possible:

According to a first embodiment, said "median" plane is defined as being midway between the said two planes containing the respective principal faces 1A, 2A for each fabrication configuration, i.e. for each set of metal plates 1, 2 to be welded.

According to a second embodiment, said "median" plane is defined as the average of such midplanes for regularly used fabrication configurations.

During this step of adjusting the field of view of the camera 6 with respect to the light source apparatus 11, or slightly before or after said step, which step is accomplished by a succession of sub-steps enabling accurate adjustment of the various parameters of the camera, it is possible to regulate the focal length of the camera regarding the light source by means of the focusing ring of the objective lens of the camera.

Once the field of view of the camera 6 has been suitably adjusted with respect to the light source apparatus 11, the camera is locked in place, and the welding operations, as well as the monitoring and control of the welding, can commence.

The described procedure of regulating the position of the camera 6 with respect to the welding head 3 can be carried out each time the arrangement of the items being fabricated is changed, and each time the camera and/or welding head is subjected to a maintenance or repair operation (whether or not accompanied by dismounting), as well as each time an anomaly is discovered, e.g. if one finds by inspection or the like that the actual quality of the weld being achieved is different from the supposed quality of the weld as indicated by the described monitoring.

Because the regulation is carried out in situ and directly takes into account the relative position between the point of impact I of the welding beam 4 and the field of view 18 of the camera 6, it is possible at any time during the welding to verify that the regulation of this relative position is correct.

What is claimed is:

1. A method of regulating the position of an infrared camera in a thermographic control and monitoring arrangement of a system for welding together at least two metal plates along a joint plane, wherein the position of said camera is regulated with respect to a welding head, and wherein the welding apparatus includes: a welding head which generates a high energy-density beam, and a camera for thermographically monitoring the welding being carried out of said welding head, which welding head and camera are both supported by a frame member, comprising the steps of:

positioning the welding beam into a reference position with respect to a point source of light disposed in a zone of the welding apparatus accessible by the welding beam, which reference position is in a plane P close to or coincident with a median plane between the two planes containing respective principal faces of the metal plates which faces are directed generally toward the welding head and infrared camera;

displacing the frame member in a direction of the plane of the joint by a specific distance d which corresponds to the distance desired in said direction between an impact point I of the welding beam on the metal plates being welded and the field of view of the camera on said plates;

adjusting the field of view of the camera such that the camera registers signals from the light source, and locking the camera in position with respect to the frame member.

2. A method according to claim 1 wherein the welding beam is positioned into a reference position by means of a light source having a low-power laser light beam visible to the eye, which low power beam is coaxial with the welding beam and serves as an aligning beam.

3. A method according to claim 2 wherein the light source further includes a diaphragm and the welding beam is positioned in a reference position with respect to the light source by directing the aligning laser beam or the welding beam toward the diaphragm of the light source.

4. A method according to claim 2 wherein the light source further includes a diaphragm and the welding beam is positioned in a reference position with respect to the light source by directing the aligning laser beam or the welding beam toward a point O disposed at a controlled distance from the diaphragm at a controlled position with respect to the diaphragm of the light source apparatus.

5. A method according to claim 1 wherein the welding beam is a laser beam, and during the first step said welding beam is positioned in a reference position by means of said welding beam itself by coupling said beam with a device which renders said beam visible.

6. A method according to claim 1 wherein said light source has a diaphragm and generates light with isotropic properties.

7. A method according to claim 1 wherein the field of view of the camera is adjusted by either displacing said camera or by electronic adjustment of said field of view of said camera.

8. A method according to claim 1 wherein prior to locking the camera in position with respect to the frame member, the focal length of the camera with respect to the light source is adjusted.

9. An apparatus for welding together at least two metal plates comprising:

a welding head which generates a high energy-density welding beam;

an infrared camera for thermographically monitoring the welding being carried out by said welding beam;

a movable frame member for supporting both said welding head and camera;

a fixed light source disposed in a zone that is accessible by the welding beam generated by the welding head, and an adjustment assembly for regulating the position of the camera with respect to the welding head.

10. An apparatus according to claim 9 wherein the light source includes:

a cavity of a rounded shape, and a diaphragm formed by an opaque plate having an aperture with diameter less than 1 mm, wherein the thickness of the opaque plate at the aperture is less than 0.3 mm.

* * * * *